United States Patent Office 3,272,718
Patented Sept. 13, 1966

3,272,718
MALTING OF BARLEY AND OTHER CEREALS
Alan A. Douglas Comrie, Manchester, and Bernard Dixon, Greygates, Harpenden, England, assignors to The Enzymic Malt Company Limited and the Dixon Malt Company Limited, both of London, England
No Drawing. Filed Aug. 24, 1962, Ser. No. 219,111
8 Claims. (Cl. 195—70)

This invention relates to improvements in the malting of barley or other cereals, and is a development of the invention described in the specification of co-pending British application No. 23,516/57.

The object of this invention is to bring about the changes in barley that convert it into malt without incurring the usual loss of dry weight which accompanies such conversion when it is carried out by traditional methods.

In our said co-pending application we have described a method of malting employing a temperature of 27° C. for the steep, and it was suggested that even higher temperatures could be employed. (In the present specification the term "steep" is deemed to include not only uninterrupted immersion of the grain, but also two immersions separate in time by an air-rest.)

The temperature mentioned above is in sharp contrast to traditional methods of melting, in which steep temperatures of up to about 16° C. are employed, and which do not envisage temperatures as high even as 20° C.

The differences between the individual barleys which a maltster encounters are considerable and have long been recognized. For example, it has been stated by Dr. W. P. K. Findlay (J. Inst. Brew., 66, 14):

"One obvious difficulty was the variation in the crop from various parts of the country, variation produced not only by the local climatic conditions, as instanced by the pre-germination in the West Country brought about by heavy rain just before harvesting, but also by the effect of fertilizers, the nature of the soils, and many other factors known to affect the quality of the crop."

It can also be said that, considering all barleys generally, the difference in steep temperatures between 16° C. and, say, 25° C. is very great, indeed so great that before our co-pending British application No 23,516/57, it would not have been considered possible in practice to steep at 25° C. without damaging the grain.

Temperautres of up to 50° C., which the present invention contemplates, would have been dismissed as utterly impracticable.

Thus, it has been stated in Brewing Industry Research Foundation Advisory Leaflet No. 6 (July 1960) that "Grain which has seemingly good germination characteristics can still be killed by incorrect steeping. This sometimes happens at the start of a new malting season when the barley is markedly different from that handled in the previous year."

The higher steeping temperatures mentioned in the aforementioned application are also used in the present invention. In addition satisfactory germination has been achieved at very much higher steeping temperatures than anything hitherto contemplated.

The present invention also introduces additionally a period when the atmosphere surrounding the grain is changed from one containing less oxygen. Germination and modification can be said to take place in three phases: (1) An initial germination phase of 20–72 hours in air immediately after steeping. (2) An anaerobic phase of 1–48 hours, and (3) a final modification phase of 20–72 hours in air. By "modification" is meant the changes in structure and composition of the grain that occur when it is converted into malt.

According to the invention, a method of malting barley or other cereal comprises steeping grain at a temperature of 22° C. to 50° C. for periods of from one to 32 hours, the length of period varying approximately inversely as the temperature, the steep preferably being aerated for the whole or part of the period and the temperature being optionally varied in the course of the steep, draining away the steep water and subjecting the grain, preferably while in the same vessel, to a germination period of 20 to 72 hours at a temperature of 12° C. to 30° C.; and subjecting the grain after germination and during a modification phase to anaerobic treatment by displacing the atmosphere surrounding the grain by water or an inert non-toxic gas, e.g.: carbon dioxide or nitrogen, or a mixture of such non-toxic gases, or a mixture of water with said inert non-toxic gas or mixture of gases, for a period of 1 to 48 hours at a temperature of up to 40° C.

During the steep an air-rest may be provided by draining away the steep water after a first period, holding the grain in air for a second period, and then introducing further steep water for a third period, said three periods totalling not more than 32 hours.

The modificatiaon phase may be varied by restoring the atmosphere of air to the gain, and maintaining the grain in this atmosphere for about 20 to 72 hours at about 15° C. to 40° C.

The moisture level in the steeped grain is determined and, if necessary, sufficient water is added, once germination has started, to raise this level to about 43%.

At all times after steeping, in order to ensure a moisture content in the grain appropriate to the condition of the grain in relation to the particular stage of malting reached, the humidity of the atmosphere surrounding the grain may be controlled. For this purpose the humidity and rate of passage of the air or gas, or mixtures thereof, supplied to the container may be varied as required. Conveniently the germinating grain may if desired be moved mechanically to prevent "matting." The duration and temperature of the steep, and the duration or presence of an air rest in the course of the steep may require to be varied according to the nature of the barley being treated.

A further feature of the invention is that the whole of the process, and also the process of drying and curing the germinated grain, may if desired be carried out in the one containing vessel.

The invention will be described with reference to the following examples.

Example 1

Grain is steeped in water at 25° C. for 8 hours, the water is drained away and replaced 16 hours later by fresh water at 25° C. for a second 8-hour immersion, after which the water is again drained away and the grain is held for 24 hours to permit emergence of the rootlets, termed "chitting." During part of this second immersion in water, and in any further wetting which the grain may require, the water used may contain a measured concentration of carbon dioxide (germination phase). The vessel holding the grain is then enclosed except for inlet and outlet pipes, and carbon dioxide is pumped or drawn in to replace part of the air. Incremental addition of carbon dioxide is made at intervals until the amount of oxygen in the vessel has been suitably reduced (anaerobic phase). The grain is then held until modification, as shown by test, is complete. If necessary to secure proper modification, air is re-admitted to the vessel at any time to stimulate the grain and prevent unwanted changes in its composition (final modification phase). Kilning and curing are by any desired method.

Instead of adding carbon dioxide, other inert, non-toxic gases, such as nitrogen, may be introduced to limit the respiration of the grain.

Example 2

The grain is steeped in water in a potentially air-tight vessel at a temperature of 25° C. for approximately 24 hours. The water is drained away and the moist grain is allowed to stand in air at 15° C. for 48 hours (germination phase). The air in the vessel is then replaced by carbon dioxide and the vessel is sealed and held for 24 hours at a temperature of 15° C. (anaerobic phase). Finally the vessel is re-opened, the carbon dioxide is replaced by air, and the grain is held in air for 48 hours (final modification phase). A further small addition of water to the grain may be made by sprinkling during this phase if considered necessary.

*Example 3*

The grain is steeped in water in a potentially air-tight vessel at a temperature of 25° C. for approximately 24 hours, with aeration during part or whole of the time. The water is drained away and the moist grain is allowed to stand in air at 21° C. for 48 hours (germination phase). It is thenceforward treated as in Example 2.

*Example 4*

The grain is steeped in water containing 0.05% of formaldehyde at 25° C. for 24 hours and thenceforward treated as in Example 2.

*Examples 5 to 8*

The general procedure of Example 2 is followed, but with variations which, for convenience, are set out in summary form in the table below.

*Example 9*

This example makes use of a somewhat higher steeping temperature than has been applied before but otherwise the time and temperature relationship of the steep is virtually unaltered. The higher temperature is continued into the initial germination phase for a shorter period and the germination process is thenceforward as in Example 2. The example is set out in summary form in the table below.

*Example 10*

The steeping temperature reaches a point where the inverse temperature/time relationship exhibited by steeps at lower temperatures departs very considerably from those relationships. This may be due to the operation of factors which are not yet fully understood. The example is set out in summary form in the table below.

*Example 11*

The temperature of 50° C. is applied in the steep for a critically short period in order to procure germination without killing an uneconomically high proportion of the grain. The grain is steeped in water in a potentially air-tight vessel at a temperature of 50° C. for one hour. The grain is then treated as in Example 10.

As regards Examples 10 and 11, it has been found experimentally that steeping the grain for the times and at the temperatures quoted has caused a sufficiently high proportion of the corns to germinate.

*Example 12*

The grain is steeped in water in a potentially air-tight vessel at a temperature of 40° C. for 2 hours and then at a temperature of 25° C. for 6 hours, with aeration during part or the whole of the time. The water is drained away and the moist grain held in air at 15° C. for 48 hours (germination phase), with the addition of sufficient water to bring the moisture level in the grain to about 43% as soon as germination has started, as shown by the emergence of rootlets (chitting). The air in the vessel is then replaced by carbon dioxide and the vessel is sealed and held for 24 hours at a temperature of 15° C. (anaerobic phase). Finally the vessel is re-opened, the carbon dioxide is replaced by air, and the grain is held in air for 48 hours (final modification phase). A further small addition of water to the grain may be made by sprinkling during this phase if considered necessary.

*Example 13*

The grain is steeped in water and held in air for a first germination period as in Example 12. The air in the vessel is then replaced by water at 40° C. and after a few minutes the water is replaced by carbon dioxide, also at 40° C. (anaerobic phase). The grain is held in this atmosphere at 40° C. for 1½ hours, after which the carbon dioxide is replaced by air at 15° C. and the grain is held in air for 68 hours (final modification phase).

*Example 14*

The grain is steeped in water as in Example 12. The water is drained away and the moist grain is allowed to stand in air at 21° C. for 40 hours (germination). The air in the vessel is then replaced by water at 40° C. and carbon dioxide at this temperature is bubbled through the water. After 1½ hours the water is drained away and the grain is held in air at 18° C. for 68 hours (final modification phase).

*Example 15*

The grain is steeped in water and held in air for a germination period as in Example 12. The air in the vessel is then displaced by a stream of dry carbon dioxide at a temperature of 40° C. which is passed through the grain for 1 hour (anaerobic phase). The grain is then sprayed for about a minute with cold water and held in air at 18° C. for 68 hours (final modification phase).

All the examples may be summarized as follows:

| Example Number | Steep Conditions | Germination & Modification Conditions | | |
|---|---|---|---|---|
| | | Initial Germination Phase | Anaerobic Phase | Final Modification Phase |
| 1 | 8 hrs. at 25° C., 16 hrs. air-rest, 8 hrs. at 25° C. | 24 hrs. in air to permit chitting. | In $CO_2$ | In air until modification is complete. |
| 2 | 24 hrs. at 25° C. | 48 hrs. in air at 15° C | 24 hrs. in $CO_2$ at 15° C | 48 hrs. in air at 15° C. |
| 3 | 24 hrs. at 25° C. with aeration for 20 hrs. | 48 hrs. in air at 21° C | do | Do. |
| 4 | 24 hrs. at 25° C. in 0.05% formaldehyde | 48 hrs. in air at 15° C | do | Do. |
| 5 | 24 hrs. at 25° C. | 48 hrs. in air at 21° C | do | Do. |
| 6 | do | 48 hrs. in air at 25° C | 24 hrs. in $CO^2$ at 25° C | Do. |
| 7 | do | 48 hrs. in air at 21° C | 48 hrs. in 50% $CO_2$ at 21° C | Do. |
| 8 | do | 72 hrs. in air at 15° C | 24 hrs. in $CO^2$ at 15° C | Do. |
| 9 | 20 hrs. at 30° C. | 24 hrs. in air at 30° C | do | Do. |
| 10 | 4 hrs. at 40° C. | 48 hrs. at 21° C | do | 24 hrs. in air at 15° C. |
| 11 | 1 hr. at 50° C. | do | do | Do. |
| 12 | 2 hrs. at 40° C., 6 hrs. at 25° C. with aeration as required. | 48 hrs. in air at 15° C | do | 48 hrs. in air at 15° C. |
| 13 | do | do | Water at 40° C. for a few minutes followed by $CO^2$ at 40° C. for 1½ hrs. | 68 hrs. in air at 15° C. |
| 14 | do | 40 hrs. in air at 21° C | Water at 40° C. with $CO_2$ bubbling through for 1½ hrs. | 68 hrs. in air at 18° C. |
| 15 | do | 48 hrs. in air at 15° C | Dry $CO_2$ at 40° C. passed through the grain for 1 hr. | Grain sprayed with cold water and held in air for 68 hrs. at 18° C. |

The above examples may be varied in one or more of the following ways:

(1) Aerating during steep, if desired.

(2) Stimulating germination by a suitable agent such as 0.1% hydrogen peroxide or 0.05% formaldehyde, added to the steep.

(3) Adjusting the acidity of the germinating grain by the addition of lactic acid in manner known per se.

It will also be appreciated that the duration of the phases may be adjusted according to the type of malt required. Thus, for a larger-type or low-modified malt, the duration of the final modification phase will be shorter than for pale ale and mild ale or highly modified malts.

We claim:

1. A method of malting cereal, which comprises steeping grain at a temperature of 22° C. to 50° C. for periods of from one to 32 hours, the length of period varying approximately inversely as the temperature, the steep preferably being aerated for at least part of the period and the temperature being optionally varied in the course of the steep, draining away the steep water and subjecting the grain to a germination period of 20 to 72 hours at a temperature of 12° C. to 30° C.; and subjecting the grain after germination and during a modification phase to anaerobic treatment by displacing the atmosphere surrounding the grain by an inert non-toxic substance from the group consisting of water, carbon dioxide, and nitrogen for a period of 1 to 48 hours at a temperature of up to 40° C.

2. A method of malting as claimed in claim 1, wherein during the steep an air-rest is provided by draining away the steep water after a first period, holding the grain in air for a second period, and then introducing further steep water for a third period, said three periods totalling not more than 32 hours.

3. A method of malting as claimed in claim 1, wherein the modification phase is varied by restoring the atmosphere of air to the grain, and maintaining the grain in this atmosphere for about 20 to 72 hours at about 15° C. to 40° C.

4. A method of malting as claimed in claim 1, wherein after germination has started the germinating grain is moved mechanically to prevent matting.

5. A method of malting as claimed in claim 1, wherein the steep water contains 0.1% hydrogen peroxide.

6. A method of malting as claimed in claim 1, wherein the steep water contains 0.05% formaldehyde.

7. A method of malting as claimed in claim 1, wherein the acidity is controlled by lactic acid.

8. A method of malting cereal as claimed in claim 1, wherein after the steep water is drained away the grain is subjected to the germination period in the same vessel as was used for the steep.

References Cited by the Examiner

UNITED STATES PATENTS

| | | | |
|---|---|---|---|
| 500,305 | 6/1893 | Tilden | 195—70 |
| 1,914,244 | 6/1933 | Dixon | 195—70 |
| 1,927,988 | 9/1933 | Muller | 195—71 |
| 2,191,838 | 2/1940 | Freiherr von Horst | 99—50.5 |
| 2,991,231 | 7/1961 | Lucht et al. | 195—71 |

A. LOUIS MONACELL, *Primary Examiner.*

ABRAHAM H. WINKELSTEIN, *Examiner.*

D. M. STEPHENS, *Assistant Examiner.*